United States Patent
Chen

(10) Patent No.: US 6,720,957 B1
(45) Date of Patent: Apr. 13, 2004

(54) METHOD FOR MANUFACTURING IMPROVED TOUCH PEN AND DEVICE FORMED THEREBY

(75) Inventor: Chien-Hung Chen, Taoyuan (TW)

(73) Assignee: High Tech Computer Corporation, Taoyuan (TW)

( * ) Notice: Subject to any disclaimer, the term of this patent is extended or adjusted under 35 U.S.C. 154(b) by 619 days.

(21) Appl. No.: 09/590,948

(22) Filed: Jun. 9, 2000

(51) Int. Cl.$^7$ ................................................ G09G 5/00
(52) U.S. Cl. ..................................... 345/179; 178/19.01
(58) Field of Search ............................ 401/195, 33, 32, 401/52, 110, 115, 117; 178/18.01–18.11, 19.01–19.07; 345/156, 157, 173–180

(56) References Cited

U.S. PATENT DOCUMENTS

| | | | |
|---|---|---|---|
| 5,581,052 A | * 12/1996 | Padula et al. | 178/19.04 |
| 5,635,682 A | * 6/1997 | Cherdak et al. | 178/19.01 |
| 5,717,435 A | * 2/1998 | Fukushima et al. | 345/179 |
| 5,850,059 A | * 12/1998 | Yoshimura | 178/19.01 |
| 6,050,735 A | * 4/2000 | Hazzard | 401/33 |

* cited by examiner

*Primary Examiner*—Dennis-Doon Chow
(74) *Attorney, Agent, or Firm*—Knoble Yoshida & Dunleavy LLC

(57) ABSTRACT

A method for manufacturing a touch pen and a touch pen are provided. Firstly, a core stick including a top end connected to a fixed portion by an easy-broken portion is prepared. The core stick is placed in a mold. A portion of the fixed portion is protruding from the mold and fixed. Then, an injected material is injected into the mold for forming a molded shell covering the core stick. By exerting a force on the easy-broken portion, the fixed portion and the core stick are separated after the molded shell is formed. A heavy touch pen with diversified appearance is thus obtained.

9 Claims, 7 Drawing Sheets

METHOD FOR MANUFACTURING IMPROVED TOUCH PEN AND DEVICE FORMED THEREBY

FIELD OF THE INVENTION

The present invention relates to a touch pen and a method for manufacturing the same, and more particularly relates to an improved touch pen and a method for manufacturing the same.

BACKGROUND OF THE INVENTION

Touch pens are well used for being input apparatuses of personal digital assistants (PDA), palm computers, or other hand-held devices. To be easily carried with these devices, the touch pens cannot have large sizes. Furthermore, a hard pen tip will be hurtful to the touch screen of the hand-held computer device. Accordingly, soft materials must be used. Unfortunately, such materials are often light and expensive, and some of them are easily to be broken. Thus, conventional touch pens are often small, light, and some of them are not strong enough. Manufacturers have attempted to solve these problems by using metals as the touch pens. However, the pen tips still must be made by soft materials because metal is too hard to the touch screen. The pen tip and the metal pen body must be jointed by screws. Accordingly, the cost is increased and the assembling is troublesome. Furthermore, it is not easy to obtain a diversified appearance from the metal touch pen. It is then attempted by the applicant to solve the above-mentioned problems.

SUMMARY OF THE INVENTION

An object of the present invention is to provide an improved touch pen and a touch pen manufacturing method.

According to the present invention, a method for manufacturing a touch pen is provided. Firstly, a core stick is prepared. The core stick includes a top end. The top end is connected to a fixed portion by an easy-broken portion. The core stick is placed in a mold. A portion of the fixed portion is protruding from the mold. By fixing the fixed portion, the core stick is fixed.

Then, an injected material is injected into the mold. A molded shell covering the core stick is thus formed.

By exerting a force on the easy-broken portion, the fixed portion and the core stick are separated after the molded shell is formed.

A hole will be formed in the molded shell while the fixed portion is removed from the core stick. There thus preferably further includes a step of filling the hole up by a pre-molded pen top.

Preferably, a bottom opening is formed on the core stick. It is preferably to plug a pen tip on the bottom opening before the core stick is placed into the mold.

When the core stick is placed into the mold, a portion of the pen tip is preferably protruding from the mold so that it is fixed by a fixing device when the injected material is injected into the mold.

Preferably, the core stick and the fixed portion are integrally formed. The easy-broken portion is preferably a groove formed at the junction of the core stick and the fixed portion.

The fixed portion preferably includes an upper portion and a lower portion. The upper portion and the lower portion have different radiuses.

Preferably, a rotation preventing portion is formed on the core stick for preventing a relative rotation between the core stick and the molded shell.

A touch pen is also provided by the present invention. The touch pen includes a core stick having a bottom opening; a pen tip put on the bottom opening; and a molded shell covering the core stick and a portion of the pen tip.

Preferably, the core stick is made of metal.

The molded shell is preferably made of plastic.

Preferably, the pen tip is made of plastic.

The molded shell preferably includes a hole formed above the core stick. The touch pen preferably further includes a pen top for filling the hole up. The pen top and the molded shell are preferably made of the same material.

According to another aspect of the present invention, a method for manufacturing a touch pen is provided. The method includes steps of jointing a plastic pen tip with a heavy core portion; and molding a plastic shell covering the heavy core portion, wherein the pen tip is protruding from the plastic shell.

The present invention may best be understood through the following description with reference to the accompanying drawings, in which:

BRIEF DESCRIPTION OF THE DRAWINGS

FIG. 1(*b*) is an exploded view of the touch pen shown in FIG. 1;

FIG. 4(*b*) illustrates the process of removing the fixed portion from the molded shell; and FIG. 4(*c*) shows that a pen top is plugged into the molded shell.

DETAILED DESCRIPTION OF THE PREFERRED EMBODIMENTS

Figure 1A:
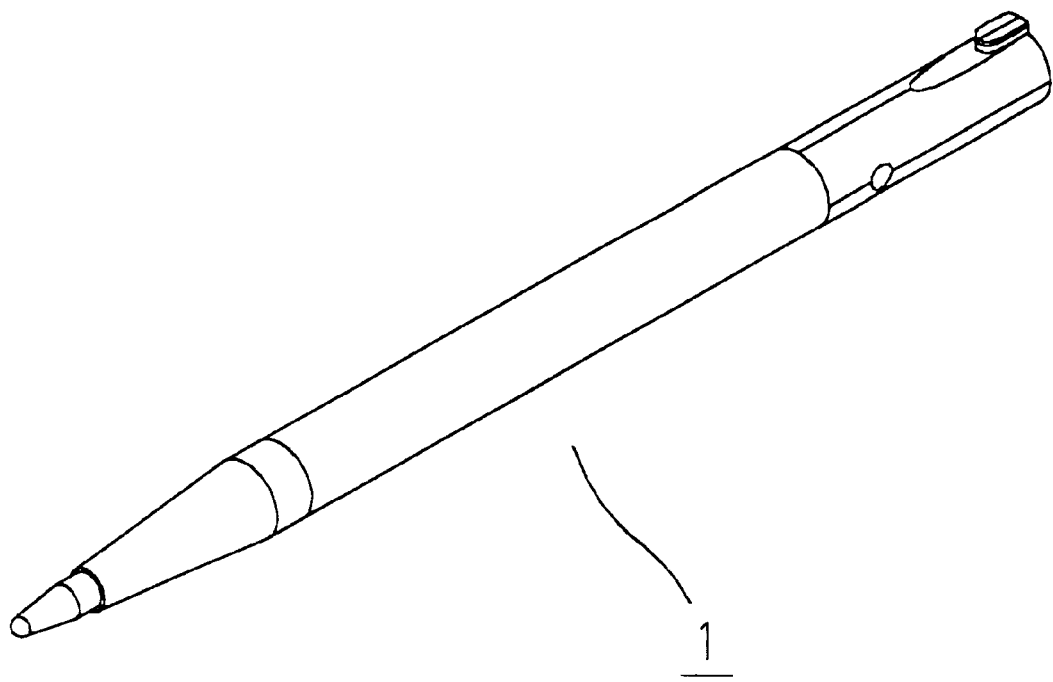
FIG. 1(*a*) is a perspective view of a touch pen according to the present invention.
Figure 1B:
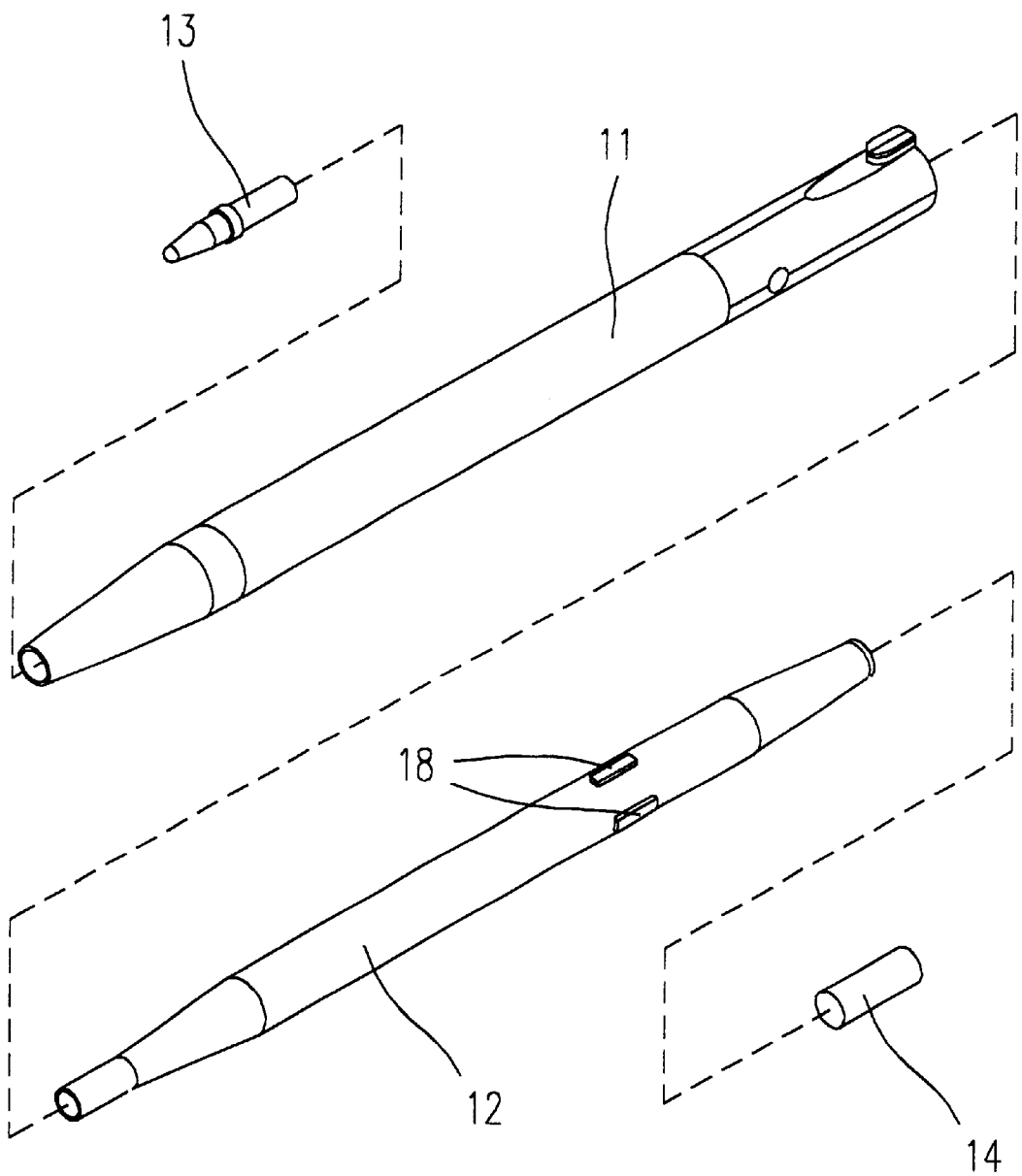

FIGS. 1(*a*) and 1(*b*) illustrate a preferred embodiment of the present invention. The touch pen 1 includes a molded shell 11, a core stick 12, a pen tip 13, and a pen top 14. The core stick 12 is made of a heavy and/or rigid material such as metal (copper, steel, etc . . . ). Accordingly, the weight of the touch pen 1 is increased. The rigidity of the touch pen may also be improved. The shape of the core stick 12 is similar to that of the molded shell 11 for molding the molded shell 11 onto the surface of the core stick 12. The molded shell 11 is often made of plastic so that the appearance of the touch pen 1 can be diversified and beautified. The pen tip 13 is made of plastic or material that is not hurtful to the surface of the screen of a PDA or other similar devices. Since the pen tip 13 and the molded shell 11 are manufactured separately, the molded shell 11 can be made of cheaper material to reduce the cost. The pen tip 13 is inserted at the bottom end of the core stick 12. The pen top 14 is inserted at the top end of the molded shell 11. The molded shell 11 and the core stick 12 are concentric so that the weight of the touch pen 1 is uniformly-distributed.

Figure 2:
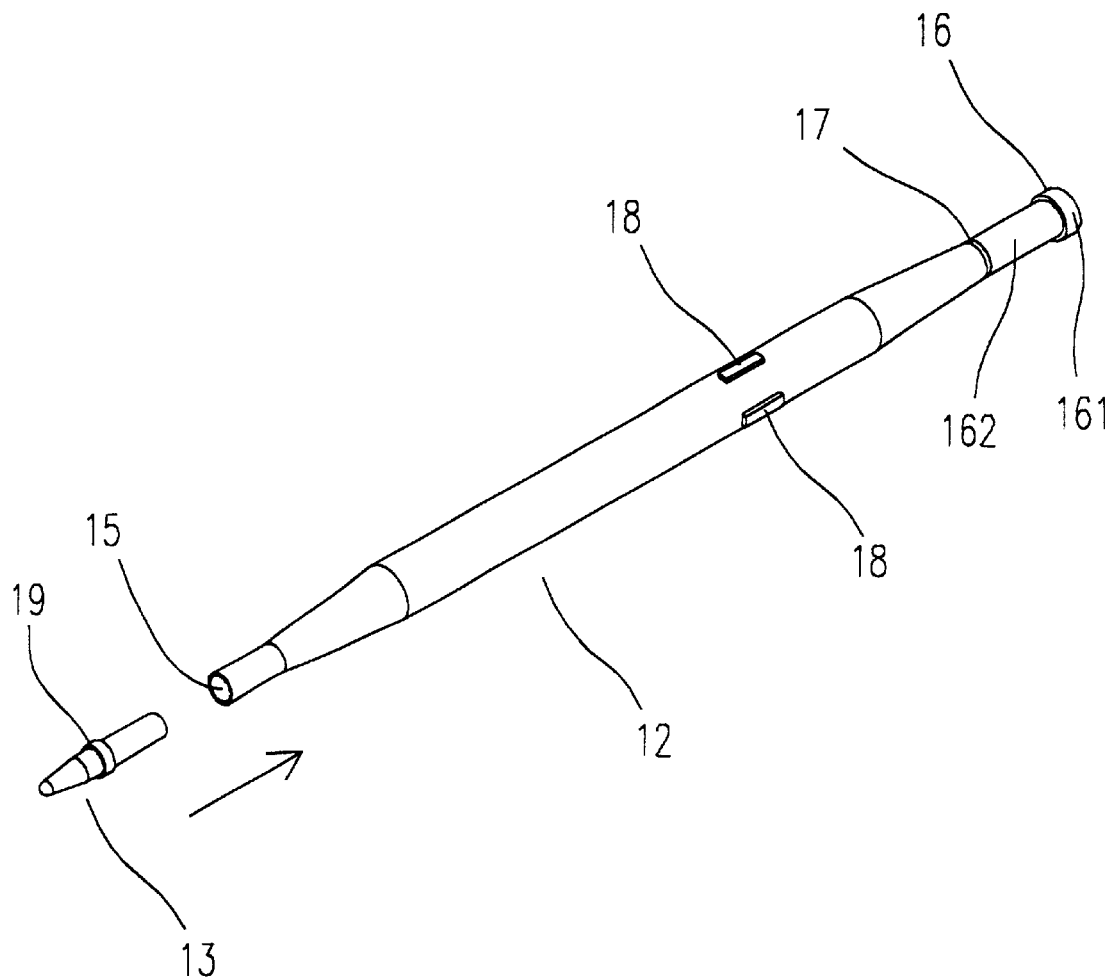
FIG. 2 is a perspective view of the pen tip and the integrally formed core stick and fixed portion.

The touch pen 1 can be manufactured by steps shown in FIG. 2 to FIG. 4(c). A row material with desired weight is chosen as the material of the core stick 12. A piece of the row material is then manufactured to integrally form the core stick 12 together with the fixed portion 16, as shown in FIG. 2, by latching, drilling, stamping, or other machining processes. The core stick 12 has a shape similar to that of the molded shell 11. The core stick 12 further includes a bottom opening 15 for receiving therein the pen tip 13. The pen tip 13 has a stopping structure 19 having a radius larger than that of the opening 15 to keep the tip portion of the pen tip 13 out of the core stick 12. The top end of the had-core body 12 is connected to the fixed portion 16. The fixed portion 16 is clamped during the molding process for fixing the core stick 12. The top portion 162 of the fixed portion 16 has a radius larger than that of the lower portion 161 for helping a more proper fixing during the molding process. An easy-broken portion 17 is formed between the core stick 12 and the fixed portion 16 so that the core stick 12 and the fixed portion 16 can be easily separated by external force. The easy-broken portion 17 is a groove formed by stamping or other mechanical processes. A plurality of flanges 18 are formed on the core stick 12 by stamping. The indentations 18 are served as a rotation-preventing portion for avoiding a relative rotation of the core stick 12 and the molded shell 11.

Two sets of molds are prepared in this embodiment. The first mold is manufactured according to the shape of the molded shell 11. The second mold is used for manufacturing the pen tip 13 and the pen top 14. The pen tip 13 must be made of material that is not hurtful to the screen. However, the material of the pen top 14 is the same as that of the molded shell 11. Accordingly, the pen tip 13 and the pen end 14 are formed by two injection processes respectively.

Figure 3:
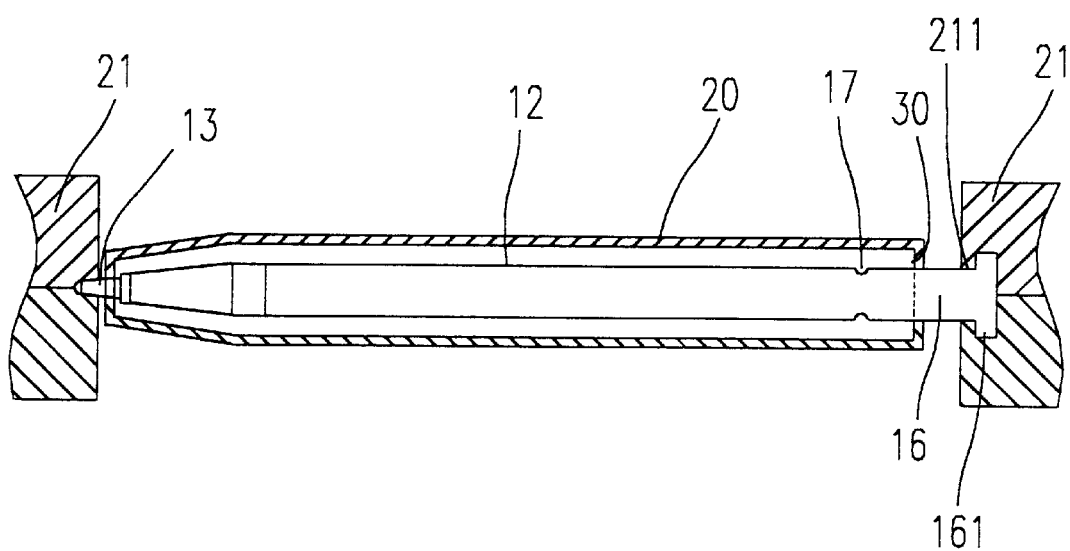
FIG. 3 is a cross-sectional view of the molding device according to the present invention.

The pen tip 13 is plugged on the bottom opening 15 of the core stick 12 as illustrated in FIG. 2. Then the core stick 12 is placed in the mold 20. A portion of the pen tip 13 and a portion of the fixed portion 16 are sticking out of the mold 20. As shown in FIG. 3, the core stick 12 together with the mold 20 are fixed on a fixing device 21. The pen tip 13 and the fixed portion 16 are clamped by the fixing device 21. The injected material is then injected from the injecting nozzle 30 into the mold 20 to form the molded shell 11. The speed and pressure of the injected material are controlled so that the injected material can cover the whole core stick 12 and the pen tip 13. The injected material is plastic or other suitable material.

The fixed portion 16 includes two cylinders: the top portion 161 and the lower portion 162. The top portion 161 has a radius larger than that of the lower portion 162. When the fixed portion 16 is clamped, the top portion 161 is totally received within the fixing device 21. The fixing device 21 includes an opening 211 having a radius smaller than that of the top portion 161. When the molded material is injected into the mold 20 from the injecting nozzle 30 with high injecting speed, a considerable drag force from the molded material is generated. This drag force may cause a forward movement of the core stick 12 in the mold 20. However, the top portion 161 is stopped by the opening 211 of the fixing device 21 to prevent the movement of the core stick 12 caused by the injected material.

The injecting nozzle 30 is located at the end opposite to the pen tip 13. It is because when the molded material is injected from the injecting nozzle, the temperature around the injecting nozzle is very high. Such a high temperature may melt the plastic-made pen tip. Accordingly, the location of the injecting nozzle must be as far as that of the pen tip so that when the injected material arrives the pen tip, the temperature is reduced and the damage of the pen tip can be neglected.

Figure 4A:
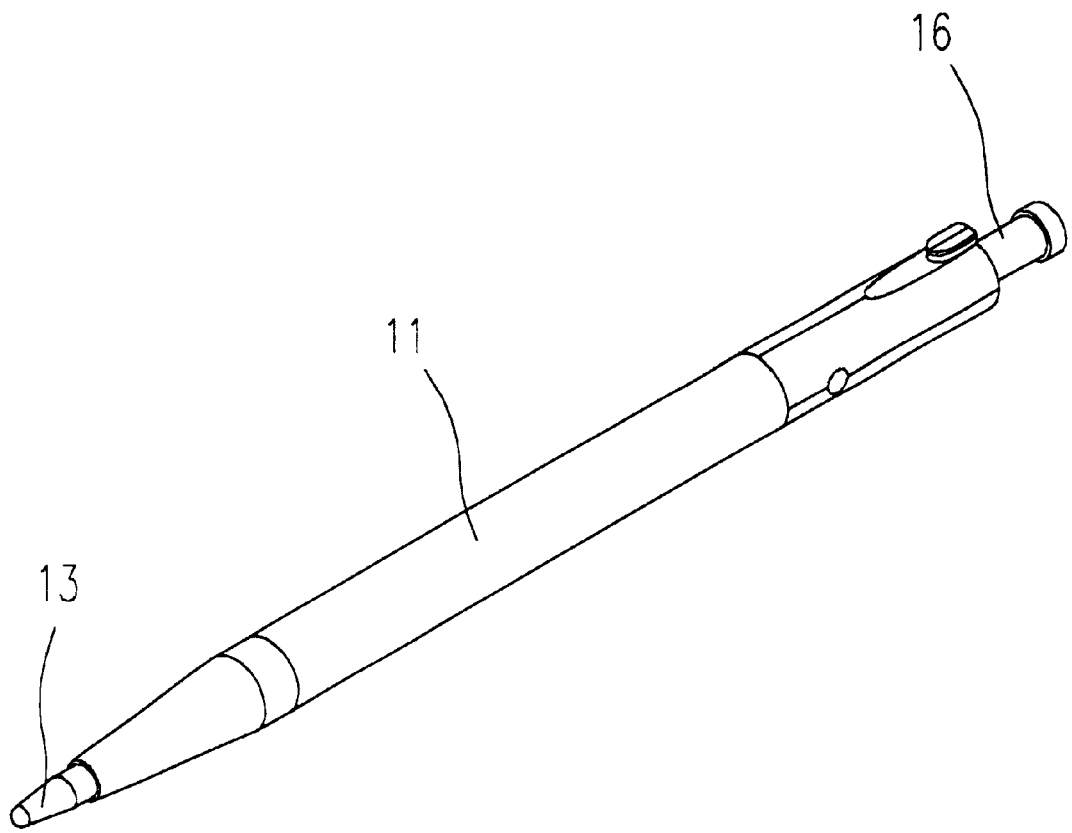
FIG. 4(*a*) is a molded product obtained from the molding device shown in FIG. 3.
Figure 4B:
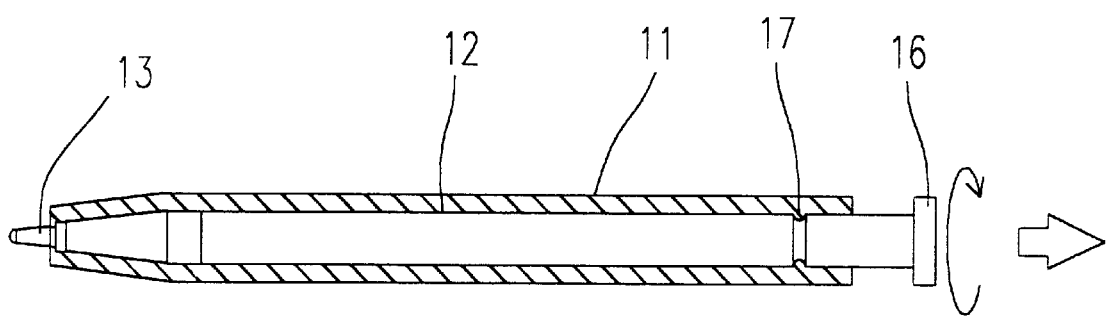
Figure 4C:
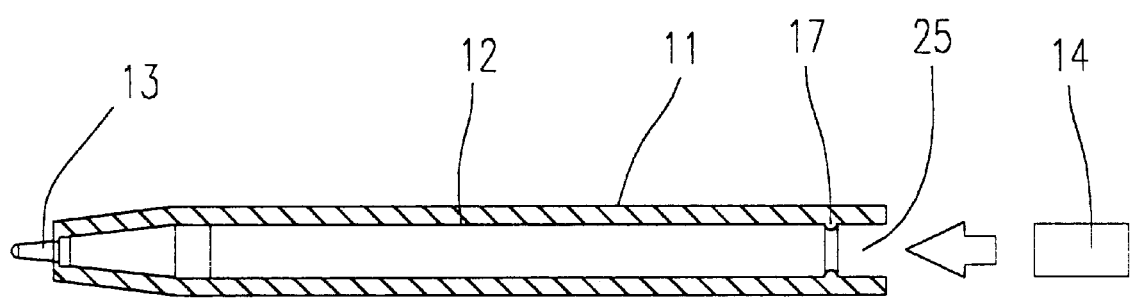

The injection product is shown in FIG. 4(a). The molded shell 11 cover the core stick 12, while the pen tip 13 and the fixed portion 16 are protruding from the bottom and top end of the molded shell 11 respectively. As illustrated in FIG. 4(b), the fixed portion 16 is twisted so that it is broken at the groove 17 and removed from the molded shell 11. A hole 25 is then formed on the top end of the molded shell 11. The pen top 14 is plugged into the hole 25. The extreme portion of the pen top 14 extruding form the hole 25 is removed by a special designed clamping device. After a polishing and other trimming processes, the touch pen 1 is obtained.

In most cases, both the pen tip 13 and the fixed portion 16 must be fixed during the molding process. However, if the core stick 12 is very short, the vibration phenomena of the core stick 12 during the molding process may be neglected. In such a situation, only the fixed portion 16 has to be clamped.

Because of the core stick of the present invention, the weight and the rigidity of the touch pen are increased. Meanwhile, the diversified appearance of the touch pen can be performed by the molding shell. Since the molding process is applied, the troublesome of screwing the pen tip to a metal pen body is avoided. Furthermore, the clamping portion is removed so that the core stick can be completely covered by the molding material. A tiny, uniformly weighted, and beautiful touch pen can be provided by the present invention in an economic method.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for manufacturing a touch pen, comprising steps of:

preparing a core stick including a top end, said top end is connected to a fixed portion by an easy-broken portion;

placing said core stick in a mold, wherein a portion of said fixed portion is protruding from said mold;

fixing said core stick by fixing said fixed portion;

injecting an injected material into said mold to form a molded shell covering said core stick; and removing said fixed portion from said core stick by exerting a force on said easy-broken portion.

2. A method according to claim 1 wherein a hole is formed in said molded shell while said fixed portion is removed from said core stick, and said method further comprising a step of filling said hole up by a pre-molded pen top.

3. A method according to claim 1 wherein a bottom opening is formed on said core stick, and said method further comprising a step of plugging a pen tip on said bottom opening before said core stick is placed into said mold.

4. A method according to claim 3 wherein when said core stick is placed into said mold, a portion of said pen tip is protruding from said mold.

5. A method according to claim 4 wherein said portion of said pen tip protruding from said mold is fixed by a fixing device when said injected material is injected into said mold.

6. A method according to claim 1 wherein said core stick and said fixed portion are integrally formed.

7. A method according to claim 6 wherein said easy-broken portion is a groove.

8. A method according to claim 1 wherein said fixed portion includes an upper portion and a lower portion, said upper portion and said lower portion having different radiuses.

9. A method according to claim 1, further comprising a step of forming a rotation-preventing portion on said core stick for preventing a rotation between said core stick and said molded shell.

* * * * *